United States Patent
Mueller et al.

[11] Patent Number: 5,725,289
[45] Date of Patent: Mar. 10, 1998

[54] ELECTROMAGNETICALLY ACTUATED VALVE, IN PARTICULAR FOR SLIP-CONTROLLED HYDRAULIC BRAKE SYSTEMS IN MOTOR VEHICLES

[75] Inventors: Klaus Mueller, Tamm; Bernhard Heugle, Grossbottwar; Kurt Herzog, Bietigheim-Bissingen; Martin Oehler, Leingarten; Günther Hohl, Stuttgart; Hans-Jürgen Herderich, Kernen, all of Germany

[73] Assignee: Robert Bosch GmbH, Stuttgart, Germany

[21] Appl. No.: 617,930

[22] PCT Filed: Sep. 17, 1994

[86] PCT No.: PCT/DE94/01076

§ 371 Date: Mar. 25, 1996

§ 102(e) Date: Mar. 25, 1996

[87] PCT Pub. No.: WO95/08461

PCT Pub. Date: Mar. 30, 1995

[30] Foreign Application Priority Data

Sep. 23, 1993 [DE] Germany .............. 43 32 368.5

[51] Int. Cl.$^6$ .................................................. B60T 8/36
[52] U.S. Cl. .................. 303/119.2; 251/83; 251/129.02; 137/529; 137/627.5
[58] Field of Search .............. 303/119.2; 137/596.16, 137/596.17, 627.5, 628, 529; 251/83, 129.02

[56] References Cited

U.S. PATENT DOCUMENTS

| | | | |
|---|---|---|---|
| 3,829,060 | 8/1974 | Von Lewis | 251/129.02 |
| 4,526,203 | 7/1985 | Leiber | 137/627.5 |
| 5,076,538 | 12/1991 | Mohr et al. | 303/119.2 |
| 5,167,442 | 12/1992 | Alaze et al. | 251/129.02 |
| 5,318,066 | 6/1994 | Burgdorf et al. | 251/83 |
| 5,370,450 | 12/1994 | Volz et al. | 303/119.2 |
| 5,476,243 | 12/1995 | Oehler et al. | 251/129.02 |

FOREIGN PATENT DOCUMENTS

| | | |
|---|---|---|
| 3934771 | 3/1991 | Germany . |
| 40 35 817 A1 | 5/1992 | Germany .............. 303/17 |

*Primary Examiner*—Robert J. Oberleitner
*Assistant Examiner*—Pamela J. Lipka
*Attorney, Agent, or Firm*—Edwin E. Greigg; Ronald E. Greigg

[57] ABSTRACT

An electromatically operated valve for automatic setting of a reduced flow cross section effective for a closed position of the valve is to be achieved. The valve has, in a valve dome, a longitudinally movable magnet armature with a separate valve push-rod which carries a closing element of a first seat valve which is open in the rest position. The first seat valve is located in a valve chamber from which a first pressure medium passage leads to a control chamber remote from the closing element and a second pressure medium passage leads to a control chamber, near the closing element, of the magnet armature. In addition, a second valve formed from the magnet armature and the valve push-rod is provided by means of which a connection between the first pressure medium passage and the second control chamber can be switched on and off. When the second valve takes up its closed position, the pressure in the control chamber remote from the closing element effects a displacement of the magnet armature against the force of a return spring and the result of this is a reduction in the flow cross section of the first seat valve. The valve can be employed in slip-controlled hydraulic brake systems of motor vehicles.

8 Claims, 1 Drawing Sheet

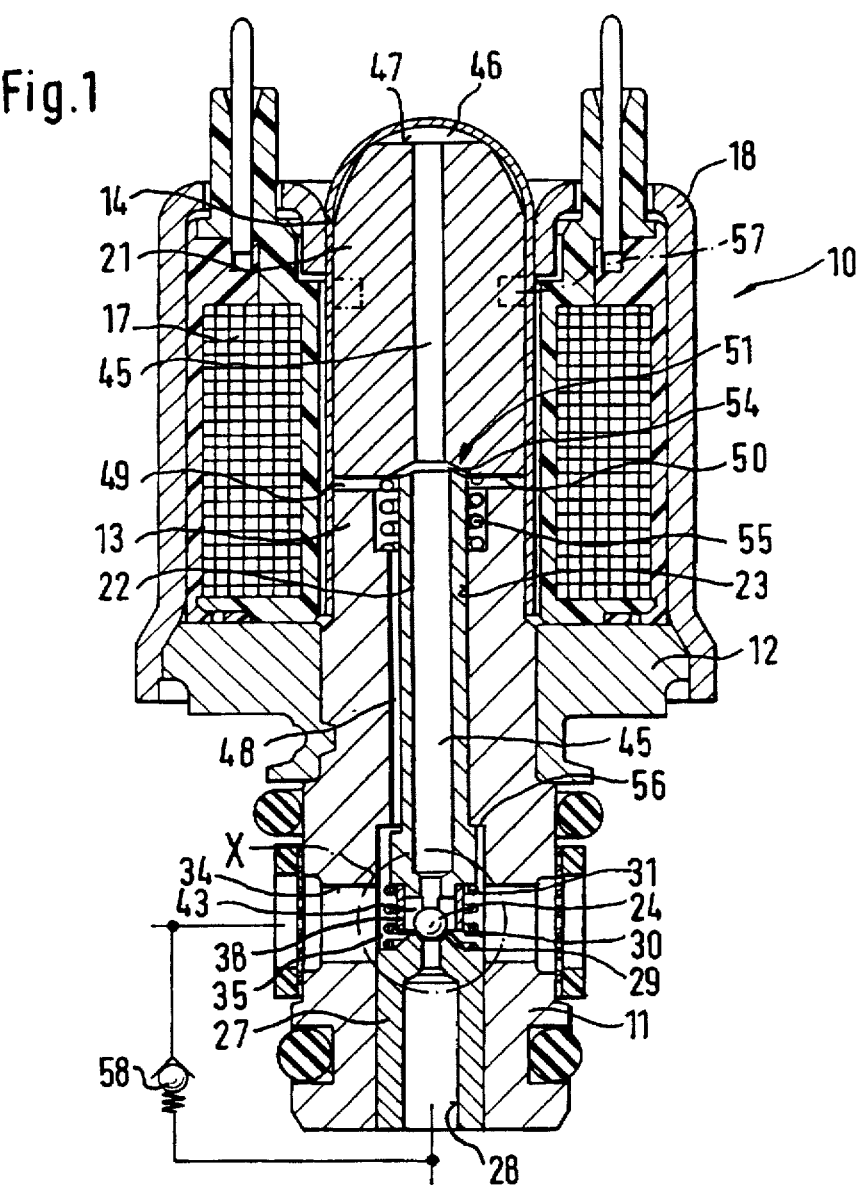
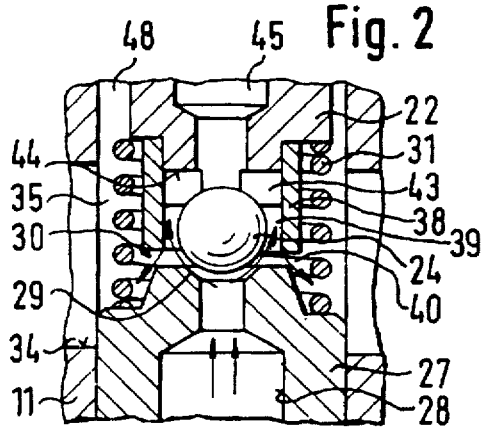
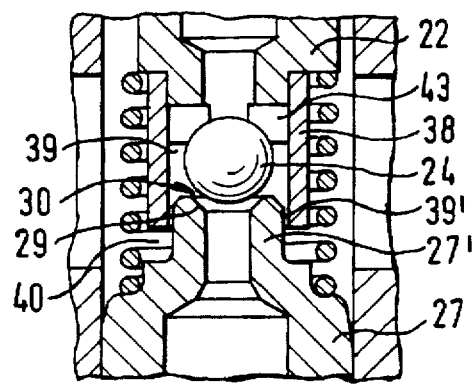

ELECTROMAGNETICALLY ACTUATED VALVE, IN PARTICULAR FOR SLIP-CONTROLLED HYDRAULIC BRAKE SYSTEMS IN MOTOR VEHICLES

RELATED PATENT APPLICATION

This application is copending with application Ser. No. 08/483,418 filed Jun. 7, 1995, which has similar features in a valve.

PRIOR ART

The invention is based on an electromagnetically actuated valve, in particular for slip-controlled hydraulic brake systems in motor vehicles.

Such a valve is known from DE 39 34 771 C1, FIG. 3. It has a control piston which is arranged in the valve dome, forms a stop for the magnet armature and is guided so that it can be displaced longitudinally on a pin which starts from the valve body and penetrates the magnet armature. The end of the control piston facing away from the armature bounds a control chamber which is in connection with the pressure medium inlet of the known valve by means of a pressure medium passage penetrating the pin and the control piston on the same axis. While the pressures are balanced on the two end surfaces of the magnet armature, pressure fed into the control chamber can displace the control piston axially against a stop. This reduces the stroke of the magnet armature by a predetermined amount and, in consequence, throttles the flow cross section.

This mode of operation of the known valve can be used in slip-controlled hydraulic brake systems in which the pressure medium inlet is in connection with the main brake cylinder and the pressure medium outlet is in connection with the wheel brake cylinder. If, for example, the valve is switched into its closed position by excitation of the magnet coil during brake slip control and, during the reduction of the pressure in the wheel brake cylinder, it generates a sufficiently large pressure drop between the pressure medium inlet and the pressure medium outlet, this causes the displacement of the control piston, as described above, with the result that when the valve is opened, the throttling, already mentioned, of the flow cross section becomes effective as long as the pressure difference between the inlet and the outlet exists. Because of the reduced gradient in the case of a build-up of pressure following a reduction of pressure in brake slip control, the reduction in the flow cross section has a favorable effect on the control quality and the noise behavior of the brake system. During a normal braking operation without danger of wheel lock, on the other hand, the full flow cross section of the valve is available and this supports a desirably short brake system response time when the brakes are actuated.

In the known valve, however, the fixed setting of the throttled flow cross section is disadvantageous because this subjects the flow quantity to fluctuations which depend on the differential pressure. In addition, the flow quantity is quite substantially dependent on the absolute dimension of the flow cross section, i.e. the stop requires very tight tolerancing. Because of the control piston necessary, furthermore, the valve is relatively costly.

ADVANTAGES OF THE INVENTION

The valve in accordance the invention with has, in contrast, the advantage that, when the second seat valve is closed, the flow cross section of the first seat valve adjusts automatically to substantially constant flow quantities, which are lower than those for the fully opened first seat valve, as a function of the forces acting on the armature, but without any magnetic force, when there is a sufficiently large pressure drop between the inlet and outlet ends of the valve. The structural outlay necessary to achieve this mode of operation, as a flow regulating valve, by the valve according to the invention is small.

Advantageous further developments and improvements to the valve are possible by means of the measures listed hereinafter.

Configuring the second valve on the components necessary in any case is particularly advantageous with respect to costs and functional reliability.

The sealed guidance of the magnet armature in the valve dome is also of advantage because this creates, in a simple manner, a separation in terms of pressure between the two end surfaces of the armature in order to generate a force effect on the magnet armature.

In addition, directing the pressure medium jet into the space bounded by the guide body is found to be advantageous because the ram pressure generated by this means increases the pressure drop acting on the magnet armature.

BRIEF DESCRIPTION OF THE DRAWING

An embodiment example of the invention is represented in a simplified manner in the drawing and is explained in more detail in the following description. FIG. 1 shows a longitudinal section through an electromagnetically actuated valve and FIGS. 2 and 3 show, at a different scale, variants of the detail (indicated by X in FIG. 1) in the region of a seat valve.

DETAILED DESCRIPTION OF THE EMBODIMENT EXAMPLE

An electromagnetically actuated valve 10 has a valve housing 11 intended for accommodation in a valve block (not shown). This valve housing 11 is permanently connected to a yoke washer 12 (FIG. 1). Beyond the yoke washer 12, the valve housing 11 is continued by a pole core 13. A tubular valve dome 14 is pushed onto one end of the pole core 13. It is tightly connected to the pole core 13 by welding. Remote from the pole core, the valve dome 14 ends in a hemisphere.

The valve dome 14 is surrounded by an annular magnet coil 17. A bell-shaped casing 18 encloses the magnet coil 17. The casing 18 engages at one end on the valve dome 14; at the other end, it is connected to the yoke washer 12.

An essentially circular-cylindrical magnet armature 21 is accommodated so that it can be moved longitudinally in the valve dome 14 which is closed at the coil end. A valve push-rod 22 starts at the magnet armature 21. It is a separate component from the magnet armature 21. The valve push-rod 22 is accommodated with clearance in a longitudinal hole 23 of the valve housing 11. At its end remote from the armature, the valve push-rod 22 carries a closing element 24 with a spherical configuration. The closing element 24, which is configured as a complete sphere in the embodiment example, has a material connection to the valve push-rod 22. As a departure from the embodiment example, the closing element 24 can also have, remote from the armature, the shape of a hemisphere or a cone or a truncated cone.

A sleeve-shaped valve body 27 with a stepped hole 28 is pressed into the section of the longitudinal hole 23 remote from the armature. This stepped hole 28 opens into a valve seat 29. The valve seat 29 is designed as a conical countersink with a cone angle of, preferably, 90°. The closing element 24 and the valve seat 29 form a first seat valve 30 of the electromagnetically actuated valve 10. When the magnet coil 17 is not excited, the first seat valve 30 takes up its open position as the rest position because of the action of a preloaded first return spring 31, which acts at one end on the valve push-rod 22 and at the other end on the valve body 27.

The valve housing 11 is provided with a transverse hole 34 crossing the longitudinal hole 23 at right angles. A valve chamber 35 accommodating the first seat valve 30 is created in the penetration region of the two holes 23 and 34. The valve chamber 35 is in connection, with a pressure medium inlet via the valve seat 29 and the stepped hole 28; and, a pressure medium outlet formed by the transverse hole 34 is connected to the valve chamber.

In addition to the first seat valve 30 and the return spring 31, a guide body 38 for the pressure medium is also located in the valve chamber 35 (FIG. 2). The guide body 38 is of sleeve-shaped design, extends on the same axis as the valve push-rod 22 and is fastened to the latter. The guide body 38 surrounds the closing element 24 of the first seat valve 30 so as to form a radial gap 39 and extends to the vicinity of the valve body 27 so as to form an axial gap 40, as may be clearly seen from FIG. 2. In the rest position of the valve 10, the axial gap 40 has a dimension which is greater than the valve stroke, i.e. the axial gap 40 is reduced to a minimum dimension in the closed position of the first seat valve 30, which forms the working position of the valve 10 and in which the closing element 24 engages with the valve seat 29.

The guide body 38 separates a partial chamber 43 from the valve chamber 35. This partial valve chamber 43 is in connection with a first pressure medium passage 45, which is designed as a longitudinal hole on the same axis as and passing through the valve push-rod and the magnet armature 21, by means of a transverse slot 44, located remote from the valve seat, of the valve push-rod 22. The first pressure medium passage 45 leads to a first control chamber 46, which is located between the end surface 47, remote from the closing element, of the magnet armature 21 and the hemispherical termination of the valve dome 14. Outside the guide body 38, a second pressure medium passage 48 is formed by a flat on the valve push-rod 22, which otherwise has a circular cross section, also emerges from the valve chamber 35. This pressure medium passage 48 ends in a second control chamber 49 which is arranged between the end surface 50, near the closing element, of the magnet armature 21 and the pole core 13 of the valve 10. In the rest position shown of the valve 10, there is a connection which conducts a pressure medium between the second control chamber 49 and the first pressure medium passage 45, on the one hand, and the first control chamber 46, on the other. This connection can be switched on and off by means of a second valve 51.

The second valve 51 is formed by a valve seat 54 on the magnet armature 21 and by the valve push-rod 22 which acts as the closing body. The valve seat 54 is designed as a conical recess which extends concentrically with the opening, near the closing element, of the first pressure medium passage 45 in the magnet armature 21. The valve push-rod 22 is appropriately shaped at the magnet armature end for interaction with the valve seat 54, for example by means of a spherical design of the end surface. In addition, a second return spring 55 is provided. This is accommodated in the pole core 13 on the same axis as the valve push-rod 22 and acts, with a preload, on the magnet armature 21.

When the magnet coil 17 is not excited, the end surface 47, remote from the closing element, of the magnet armature 21 is supported on the valve dome 14 by the action of the second return spring 55. In the rest position shown of the valve 10, the valve push-rod 22 is likewise in contact with a stop 56 of the valve housing 11. The stroke of the first seat valve 30 is dimensioned by this stop 56. In the rest position of the magnet armature 21 and the valve push-rod 22, the stroke of the second valve 51 when taking up its open position is also specified at the same time. This stroke is smaller than that of the first seat valve 30. When the valve 10 is switched into the working position, the magnet armature 21, which is moved towards the pole core 13 by the excitation of the magnet coil 17, first closes the second valve 51 before it executes the closing stroke of the first seat valve 30, and vice versa.

At the periphery, i.e. between the two end surfaces 47 and 50, the magnet armature 21 is sealed against the valve dome 14. This sealing can take place by means of a gap seal or a labyrinth seal; it can also, however, consist of the arrangement of a sealing ring 57 or a sliding ring on the magnet armature 21, as is indicated by interrupted lines in FIG. 1.

The valve 10 is particularly intended for use in slip-controlled hydraulic brake systems of motor vehicles. In agreement with the brake system represented in FIG. 1 of DE-39 34 771 C1 mentioned at the beginning, it has to be arranged as the inlet valve in a brake conduit between a main brake cylinder and a wheel brake cylinder. The pressure medium inlet formed by the stepped hole 28 is then in connection with the main brake cylinder and the transverse hole 34, as the pressure medium outlet, is in connection with the wheel brake cylinder. The valve 10 can be by-passed by a return conduit which starts from the brake conduit at the wheel brake cylinder end and re-enters the brake conduit at the main brake cylinder end. An outlet valve and, following the latter in the flow direction, a return pump are located as essential elements in the return conduit. A non-return valve 58 between the pressure medium outlet and the pressure medium inlet is expediently arranged in parallel with the valve 10 in order to by-pass the first seat valve 30. When the main brake cylinder is pressure-relieved, this non-return valve 58 permits unthrottled return flow from the wheel brake cylinder to the main brake cylinder.

The function of the valve 10 is explained below using the brake system mentioned:

When a braking operation without danger of wheel lock is initiated by the driver of the vehicle, the valve 10 takes up its rest position shown, i.e. the first seat valve 30 is open, as is the second valve 51. The pressure generated by actuation of the main brake cylinder causes an increase in pressure in the wheel brake cylinder due to the displacement of partial quantities of pressure medium in the brake conduit. As is explained by means of FIG. 2 and illustrated by the arrows, the displaced pressure medium coming from the stepped hole 28 enters the valve seat 29 and leaves the latter as a first partial volume flow while flowing around the closing element 24 as a pressure medium jet of hollow conical shape. This does not cause any noticeable ram pressure in the partial valve chamber 43 because the latter is connected to the pressure medium outlet through the first pressure medium passage 45, the open second valve 51 and the second pressure medium passage 48. The pressure medium entering the partial valve chamber 43, which acts as a ram pressure space, leaves the radial gap 39, having substantially reversed its flow direction, as a second partial volume flow and passes through the axial gap 40 and the valve chamber 35 to the pressure medium outlet. In the case of pressure relief taking place from the main brake cylinder, the pressure medium makes its way in the reverse flow direction through the axial gap 40 and the open first seat valve 30 in the direction toward the main brake cylinder and through the non-return valve 58 arranged in parallel with the valve 10.

In the case of a braking operation with danger of wheel lock, the valve 10 is switched, by excitation of the magnet coil 17, into the working position in which the first seat valve 30 and the second valve 51 are transferred to the closed position by displacement of the magnet armature 21 and the valve push-rod 22 against the force of the return springs 31 and 55. The second valve 51 then shuts off the connection between the first pressure medium passage 45 and the second control chamber 49 while the connection between the first pressure medium passage and the first control chamber 46 remains unimpaired. At the same time, the outlet valve in the return conduit (see FIG. 1 in DE 39 34 771 C1) is switched into the through position and the return pump is put into operation. Removing partial quantities of pressure medium from the wheel brake cylinder and pumping them back to the main brake cylinder reduces pressure at the wheel brake end and reduces the danger of wheel lock. In the pressure retention phase following a pressure reduction in the wheel brake cylinder, the valve 10 remains in the working position while the outlet valve in the return conduit is switched into the closed position.

For pressure build-up in the wheel brake cylinder, the outlet valve remains in the closed position whereas the valve 10 is no longer excited. This causes a displacement of the magnet armature 21 in the direction towards the control chamber 46 because of the effect of hydraulic forces and the two return springs 31 and 55, so that the closing element 24 begins to free the valve seat 29 and the first seat valve 30 is opened. The second valve 51, however, still remains closed. Because of the reduction in pressure in the wheel brake cylinder, there is a pressure drop between the inlet end and the outlet end of the first seat valve 30. The lower pressure at the outlet end is also effective in the second control chamber 49 because of the second pressure medium passage 48. During the opening motion of the magnet armature 21, the ram pressure in the partial valve chamber 43 generated by the pressure medium continuing to flow from the main brake cylinder end has an additional effect in the control chamber 46 remote from the closing element because of the first pressure medium passage 45—but not in the second control chamber 49, because the second valve 51 keeps the connection between the control chamber 49 and the first pressure medium passage closed. The second valve 51, which is closed during the major part of the return stroke of the magnet armature 21, therefore prevents a pressure balance between the first control chamber 46, which is remote from the closing element, and the second control chamber 49, which is near the closing element. The magnet armature 21, which is not pressure balanced, is therefore subjected to a force acting against the return springs 31 and 55 and this force permits the valve push-rod 22 to take up a position between the closed position and the open position of the first seat valve 30. The resulting reduction in the flow cross section of the first seat valve 30 effects throttling of the pressure medium flow with a slower increase in pressure in the wheel brake cylinder. If there is a sufficient pressure drop, the valve 10 regulates the flow quantity to a substantially constant amount because a higher differential pressure effects a larger ram pressure, with a consequent reduction in the flow cross section at the first seat valve 30, and vice versa. As the pressure drop decays, the ram pressure in the partial valve chamber 43 is also reduced. The return springs 31 and 55 return the magnet armature 21 to its rest position in which the second valve 51 takes up its open position. The valve 10, with the valve push-rod 22 supported on the stop 56, now frees its full flow cross section in the first seat valve 30 for the following normal braking operation. If the braking operation is interrupted by relief of the main brake cylinder when there is a reduced flow cross section of the first seat valve 30, however, the pressure medium can also drain unretarded from the wheel brake cylinder through the non-return valve 58.

The sensitivity of the valve 10 in the direction towards smaller pressure drops can be increased by the variant, as represented in FIG. 3, of the first seat valve 30 with guide body 38. In this configuration, the valve body 27 is provided with a spigot-shaped projection 27' directed towards the valve push-rod 22. This projection 27' includes the valve seat 29. The guide body 38 is extended axially beyond the closing element 24 and encloses the projection 27' so as to form a second radial gap 39'. In this variant, the first radial gap 39 and the axial gap 40 are again present. Relative to the first embodiment described above, the second radial gap 39' effects an increase in the ram pressure in the partial valve chamber 43.

The foregoing relates to preferred exemplary embodiments of the invention, it being understood that other variants and embodiments thereof are possible within the spirit and scope of the invention, the latter being defined by the appended claims.

What is claimed is:

1. An electromagnetically actuated valve (10) for slip-controlled hydraulic brake systems in motor vehicles, in which:

a magnet armature (21) is accommodated so that it can be moved longitudinally in a valve dome (14), the valve dome (14) is surrounded by a magnet coil (17), a valve push-rod (22) with a closing element (24), of a first seat valve (30) is fastened to the valve push-rod remote from the magnet armature (21) and is associated with the armature, a valve body (27) with a valve seat (29) as a pressure medium inlet for the first seat valve (30) is arranged in a housing (11) of the valve (10), when the magnet coil (17) is not excited, a first return spring (31) raises the closing element (24) by a spring force of the first return spring (31) from the valve seat (29), the first seat valve (30) is located in a valve chamber (35) which is in connection with a pressure medium outlet of the valve (10), the valve chamber (35) has a partial valve chamber (43), acting as a ram pressure space, from said partial valve chamber (43) a first pressure medium passage (45) in said valve push-rod (22) and said armature extends to a first control chamber (46) located at an upper end (47) of the magnet armature (21) remote from the closing element, a second pressure medium passage, (48) extends from the valve chamber (35) to a lower end (50) of the magnet armature (21) near to the closing element, a pressure generated in the partial valve chamber (43) brings about a force in the first control chamber (46), the force acts counter to the force of the first return spring (31) on the magnet armature (21), and because of this counter force, the first seat valve (30) assumes a partially closed position that differs from a rest position of said seat valve, wherein: the upper end surface (47), remote from the closing element, of the magnet armature (21) bounds the first control chamber (46) and the lower end surface (50), near the closing element, of the magnet armature (21) bounds a second control chamber (49) which is in connection with the second pressure medium passage (48), a second valve (51) is provided for switching on and off a connection between the first pressure medium passage (45) of the push-rod (22) and the second control chamber (49), in the rest position of the magnet armature (21), the second valve (51) frees the connection between the first pressure medium passage (45) and the second control chamber (49) and, when the magnet armature (21) is displaced longitudinally out of the rest position of said armature, this second valve (51) keeps the connection closed.

2. The valve as claimed in claim 1, wherein the magnet armature (21) and the valve push-rod (22) are separate components which are separated from one another, which are penetrated on the same axis by the first pressure medium passage (45), said valve push-rod and said armature are held in the rest position by the force of a second return spring (55) and the separate components, in order to form the second valve (51), said magnet armature has a valve seat (54) and the push-rod is configured as a closing body.

3. The valve as claimed in claim 2, wherein the magnet armature (21) has a valve seat (54) concentrically arranged relative to the opening of the first pressure medium passage (45) at the valve push-rod end, whereas the end surface of the valve push-rod (22) at the magnet armature end is formed as matched closing body.

4. The valve as claimed in claim 2, wherein, in the rest position, the valve push-rod (22) is supported on a stop (56) of the valve housing (11) under the action of the first return spring (31) and the end surface (47) of the armature, remote from the closing element, of the magnet armature (21) is supported on the valve dome (14) because of the action of the second return spring (55).

5. The valve as claimed in claim 1, wherein the magnet armature (21) is sealed at the periphery against the valve dome (14).

6. The valve as claimed in claim 1, wherein the closing element (24) of the first seat valve (30) has a spherical design at least at the valve seat end and is surrounded to near the valve body (27) by a sleeve-shaped guide body (38) arranged on the valve push-rod (22) and on the same axis as the latter, in such a way that a pressure medium jet emerging from the valve seat (29) enters a gap (39) between the closing element (24) and the guide body (38) and that a connection, to the first pressure medium passage (45), carrying pressure medium and screened from the valve chamber (35) emerges from this gap (39).

7. The valve as claimed in claim 6, wherein the valve seat (29) of the first seat valve (30) is arranged in a spigot-shaped projection (27') of the valve body (27) and this projection (27') is surrounded peripherally by the guide body (38) of the valve push-rod (22).

8. A valve as claimed in claim 6 in which said first seat valve 30 has a conical design.

* * * * *